W. G. R. BRAEMER.
APPARATUS FOR PURIFYING AIR.
APPLICATION FILED JAN. 7, 1908.
1,037,424.
Patented Sept. 3, 1912.
2 SHEETS—SHEET 1.
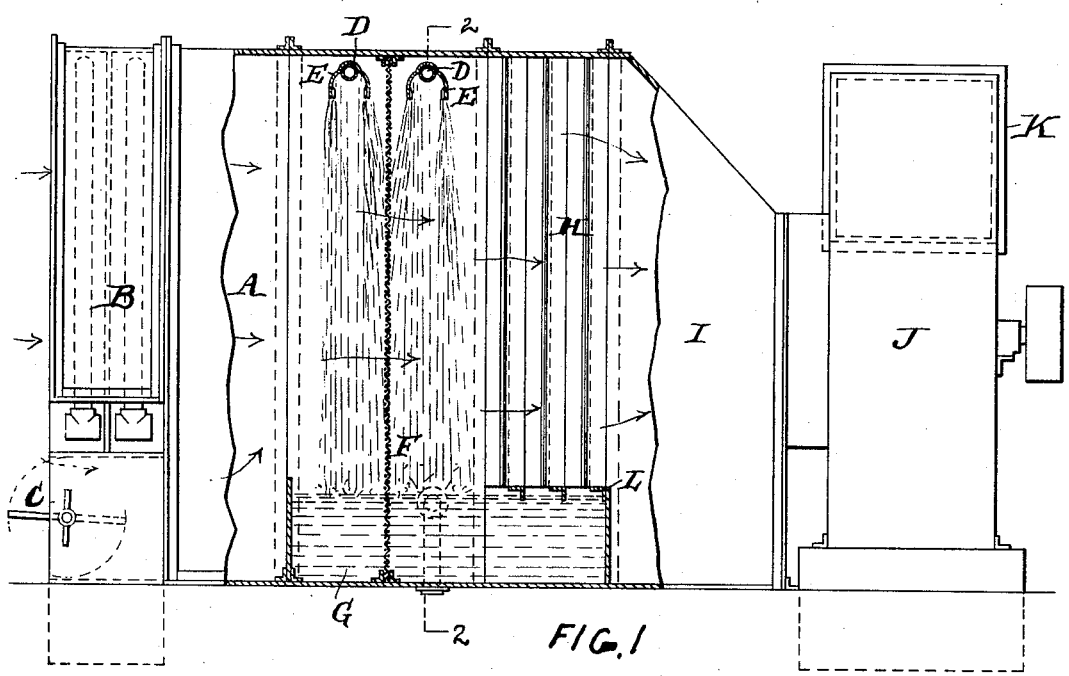
FIG. 1
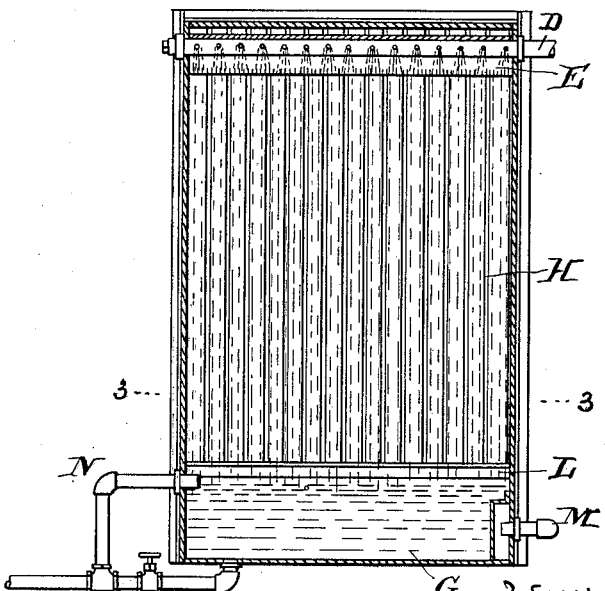
FIG. 2
Witnesses
Daniel Webster, Jr.
M. F. Driscoll.
Inventor
William G. R. Braemer
By 
Attorney

W. G. R. BRAEMER.
APPARATUS FOR PURIFYING AIR.
APPLICATION FILED JAN. 7, 1908.

1,037,424.

Patented Sept. 3, 1912.

2 SHEETS—SHEET 2.

Witnesses
Daniel Webster, Jr.
M. F. Driscoll

Inventor
William G. R. Braemer
By
Attorney

UNITED STATES PATENT OFFICE.

WILLIAM G. R. BRAEMER, OF BUFFALO, NEW YORK, ASSIGNOR TO WARREN WEBSTER & COMPANY, A CORPORATION OF NEW JERSEY.

APPARATUS FOR PURIFYING AIR.

1,037,424.  Specification of Letters Patent.  Patented Sept. 3, 1912.

Application filed January 7, 1908. Serial No. 409,638.

*To all whom it may concern:*

Be it known that I, WILLIAM G. R. BRAEMER, a citizen of the United States, and a resident of the city of Buffalo, county of Erie, and State of New York, have invented an Improvement in Apparatus for Purifying Air, of which the following is a specification.

My invention has reference to apparatus for purifying air, and consists of certain improvements which are fully set forth in the following specification, and shown in the accompanying drawings, which form a part thereof.

The object of my invention is to provide a suitable construction of apparatus designed for the treatment of air which shall be adapted for properly cleansing the air as well as imparting to it the desired degree of humidity.

My invention consists of a humidifying apparatus provided with means for spraying water in the path of the current of air, when combined with an eliminator for removing the excess of water consisting of vertical bars presenting oppositely directed oblique faces, one in front of the other, and united by a joint which forms a vertical groove or channel at the rear end of the forward oblique face of the bar.

My invention also comprehends details of construction which, together with the features above specified, will be better understood by reference to the drawings, in which:—

Figure 3:
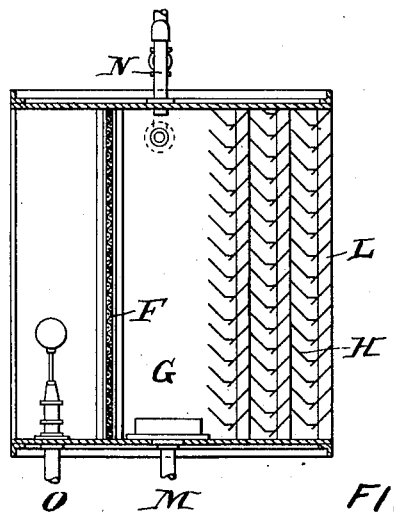
Figure 4:
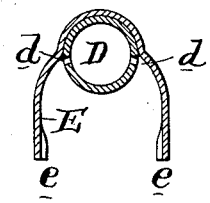
Figure 6:
Figure 5:
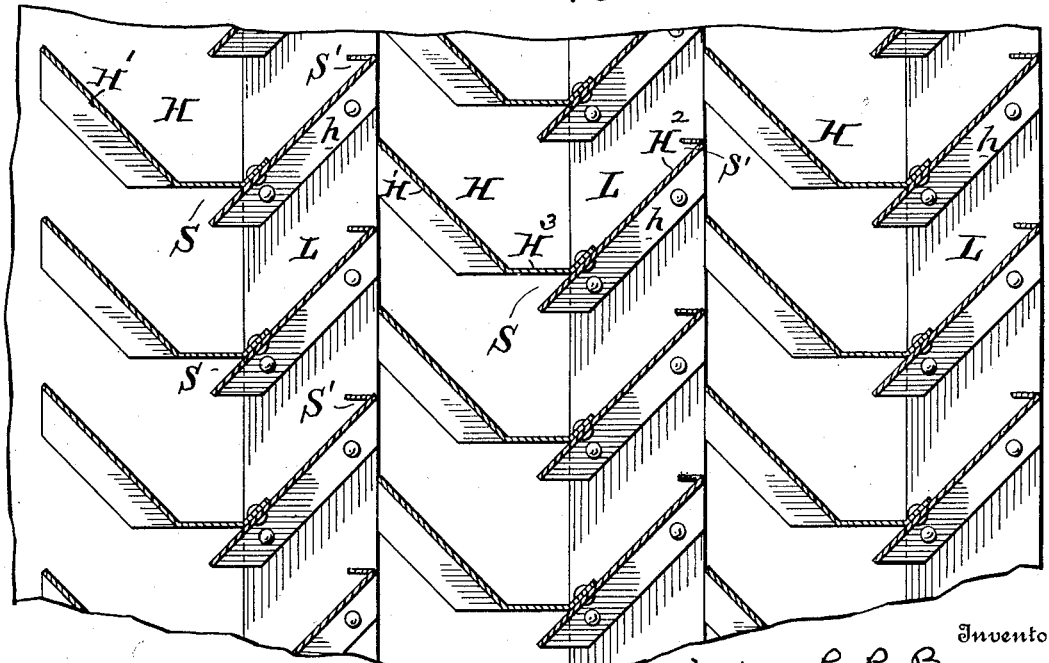

Figure 1 is an elevation of an air purifier with part broken away, showing my improvements; Fig. 2 is a transverse sectional elevation of the same on line 2—2; Fig. 3 is a sectional plan view of the central portion of the apparatus on line 3—3 of Fig. 2; Fig. 4 is an enlarged cross section of the spraying devices shown in Fig. 1; Fig. 5 is an enlarged view of the eliminator structure shown in Fig. 3; and Fig. 6 is an end view of a modified form of the eliminator bars.

A is a chamber formed of sheet metal through which the air is caused to pass. The air is supplied to the purifier through tempering coils B, which may be heated by steam. To regulate the temperature of the air passing through the machine, the air heated by the tempering coils may be diluted by fresh unheated air admitted by a by-pass valve C, for diluting the heated air to the proper degree and thereby reducing its temperature. The heated air is then drawn through the apparatus by means of a suction blower J which discharges the cleansed and humidified air at K, which may lead to the room or compartment in which the air is to be delivered.

The air which enters the chamber A is caused to pass through sprays of water discharged from pipes D above a tank G and in this manner become washed and at the same time humidified to the desired degree. After the air has been treated to the water sprays, it is caused to pass through the eliminator H. By impinging of the air against the oblique surfaces of the vertical bars, the excess of water carried forward by the air is given up and deposited upon these bars and allowed to run downward into the tank G.

The eliminator bars are formed of front oblique sections H' and rear oblique sections H² which are connected by short bent portions H³ of the sections H', forming between said parts H³ and the forward edge of the sections H² V-shaped grooves or recesses S which act as obstructors to the air which pass over the surfaces of the sections H' and operate to catch the excess of water which may be blown over the surfaces of the sections H' rearward, or which may be suspended in the passing air. When the water is caught in the grooves S, it is required to pass downward until it reaches the tank, because the action of the air will not permit the said water to escape out of the grooves once it is caught therein. The rearmost edge of the inclined section H² of these bars may be bent forward to form a groove S' which may catch the eliminated water from the surface of the section H² or from the air which strikes said section and moves rearwardly. The portions H³ which connect the sections H' and H² act as deflectors for the air which is directed between the sections H' of adjacent bars and cause it to change its direction and pass upward against the sections H². This change in the direction of the air, however, induces it to give up a material part of its suspended water upon the surfaces of the sections H² which may be ultimately collected and discharged downward by the grooves S' therein. These vertical bars H² may be flanged at the bottom as at H, and be riveted upon transverse bars L, arranged at the level of the water in the tank G.

The air gives up the main part of its water in passing between the first row of vertical bars and is brought to the proper condition of humidity by the time it passes through the succeeding rows of bars, and when it reaches the chamber I of the purifier it is in the proper condition to be delivered to the building or room by the blower J. It is evident, however, that if it is desired to raise the temperature of the air thus purified and humidified to a higher degree, this may be accomplished in the ordinary well known manner by passing it over a reheating device.

The spraying pipes D are provided with a series of oppositely directed apertures *d* and arranged over these pipes are spraying shields E which may have irregular or corrugated shaped lower edges *e* to subdivide the water. Any other suitable form of spraying device may be employed. As shown in Fig. 1, two such spraying devices are employed, but if desired one may be dispensed with.

The tank G is provided with an overflow and drain connection N. The water of the tank may be drawn off at M through a strainer and be discharged through the spraying pipe D by the usual circulating pump (not shown). The water may be maintained at any temperature desired.

At F, is shown a wire screen against which the water may be sprayed to form a surface of flowing water through which the air may be caused to pass. This screen, however, may be omitted if so desired.

O is a supply pipe having an automatic float valve by which the bevel of the water may be maintained within the tank, fresh water being supplied to compensate for that conveyed away by the humidification of the air.

In my improved eliminator, the bars having the sections H′ and H², presenting oppositely directed oblique surfaces and provided with the vertical groove S is an important feature of construction, as by this means the air is treated to the proper scrubbing and eliminating action, and the water eliminated is not permitted to be again taken up by the air. Furthermore, matter such as soot which may be given up by the air upon the surfaces of the sections H′ H² is caught in the grooves S′ S′ and not permitted to be conveyed beyond the particular bar on which it is deposited. By arranging the successive series of bars in staggered relation, as indicated in Fig. 5, there is practically a continuous line of plates against which the air is required to impinge from the time it enters the eliminator to the time it leaves it, and consequently the greatest possible treatment of the air is given. Furthermore, the air is subjected to the most effective cleansing and eliminating operations without placing excessive resistance upon its flow, and consequently the capacity of the machine is a maximum for the duty which it is required to perform.

The general construction of the purifier may be varied; and while I prefer the construction shown, the details thereof may be modified without departing from the spirit of the invention.

Having now described my invention, what I claim as new, and desire to secure by Letters Patent, is:—

1. In an air purifier, the combination of the chamber through which the air is passed, means to control the temperature of the incoming air, means for treating the air to a spray of water, and an eliminator composed of a series of rows of independent vertical bars each consisting of front and rear surfaces arranged obliquely in opposite directions and having their junction formed with a vertical groove to the rear of the plane of the front oblique surface so as to permit the water from the oblique surface to enter the groove but cause the air to pass without excessive obstruction.

2. In an air purifier, the combination of the chamber through which the air is passed, means to control the temperature of the incoming air, means for treating the air to a spray of water, and an eliminator composed of a series of rows of independent vertical bars, the bars of each row being staggered relatively to the bars of the next adjacent row and each consisting of front and rear surfaces arranged obliquely in opposite directions and having their junction formed with a vertical groove and also having the rear free edge of the rear oblique surface terminating in a vertical grooved portion, said grooved portions being adapted to arrest the water driven rearward over the oblique plates and convey it out of the air current.

3. In an air purifier, the combination of the chamber through which the air is passed, means to control the temperature of the incoming air, means for treating the air to a spray of water, and an eliminator composed of a series of vertical bars each consisting of front and rear plates having surfaces arranged obliquely in opposite directions and having their junction formed with a vertical groove by a rearwardly extending part of the front plate being connected with the rear plate a short distance back of its forward edge and said forward edge being in substantial alinement with a plane through the front oblique plate.

4. An eliminator for an air purifier apparatus consisting of a series of rows of independent bars arranged vertically each bar consisting of oblique plates arranged in essentially V shape cross section and having a vertical groove at the junction of the oblique plates and also a vertical groove adjacent to the front face and rear edge of the rearmost oblique plate and the bars of each row being staggered relatively to the bars of the adjacent rows.

5. An eliminator for an air purifier apparatus consisting of a series of rows of independent bars arranged vertically each bar consisting of oblique plates arranged in essentially V shape cross section and having a vertical groove at the junction of the oblique plates, said groove being in the main part back of the plane of the oblique surface of the front plate and the bars of each row being staggered relatively to the bars of the next adjacent rows.

In testimony of which invention, I have hereunto set my hand.

WM. G. R. BRAEMER.

Witnesses:
R. M. HUNTER,
R. M. KELLY.